United States Patent [19]

Andersson et al.

[11] 4,407,698

[45] Oct. 4, 1983

[54] APPARATUS FOR REGULATING FIBER CONCENTRATION

[75] Inventors: Nils E. Andersson; Sten Eriksson; Bengt Sinner, all of Västerås, Sweden

[73] Assignee: ASEA Aktiebolag, Västerås, Sweden

[21] Appl. No.: 248,867

[22] Filed: Mar. 30, 1981

[30] Foreign Application Priority Data

Apr. 3, 1980 [SE] Sweden .............................. 8002587

[51] Int. Cl.[3] .......................... D21C 1/06; D21C 1/08

[52] U.S. Cl. .................................... 162/258; 162/259; 162/262

3,981,767 9/1976 Abdul-Rahman .................. 162/262

4,108,574 8/1978 Bantley et al. ........................ 417/20

*Primary Examiner*—Steve Alvo

*Attorney, Agent, or Firm*—Watson, Cole, Grindle & Watson

[57] ABSTRACT

An apparatus for regulating the fiber concentration of a fiber suspension during transport of the fiber suspension through a conduit which comprises a variable speed-controlled electric motor driving a pump for impelling the fiber suspension through the conduit to an outlet of the latter. A system is provided for obtaining a measure of the power supplied by the motor to the pump and for dividing this measure by a signal proportional to the

APPARATUS FOR REGULATING FIBER CONCENTRATION

TECHNICAL FIELD

This invention relates to an apparatus of the kind employed for regulating the fiber concentration of a fiber suspension during transport of the fiber suspension through a conduit to an outlet thereof. The need for such apparatus arises in various industries. For example, in the paper-making industry it is desired to regulate the fiber concentration in the fiber stock supplied via a conduit to a paper-making machine for the purpose of controlling the weight per unit area (hereinafter called the "superficial weight") of the paper produced.

BACKGROUND ART

Heretofore, the amount of fiber suspension per unit of time passing through a conduit, for example a conduit supplying fiber stock to a paper-making machine, has been measured using a fiber concentration meter, and the measured values from this meter have been used for regulating the fiber concentration in the fiber suspension. However, these fiber concentration meters do not have sufficient accuracy of measurement to provide a sufficiently high degree of regulation of the fiber concentration.

The present invention aims to provide an apparatus of the kind referred to which has greater accuracy than the hitherto known apparatus employing fiber concentration means. The invention is based on the realisation that there is a relationship between the fiber concentration of a fiber suspension being pumped through a conduit and the pressure head loss undergone by the fiber suspension in passing through the conduit, after making any necessary allowance for static pressure head loss in the conduit. Thus, for pumping fiber suspensions having concentrations of fiber in excess of a certain minimum value, for example in excess of 2 percent by weight of fiber, the dynamic pressure head loss measured over a section of the conduit through which the fiber suspension is being pumped, is almost proportional to the fiber concentration in the fiber suspension.

SUMMARY OF INVENTION

According to the invention, apparatus for regulating the fiber concentration of a fiber suspension during transport of the fiber suspension through a conduit to an outlet thereof comprises a variable speed controlled electric motor, a pump driven by the motor for impelling the fiber suspension through the conduit toward the outlet, means for obtaining a measure of the power W supplied to the pump by the electric motor, a flow meter providing an output signal $q_1$ proportional to the flow of the fiber suspension in the conduit upstream or downstream of the pump, means for deriving from W and $q_1$ obtaining a value which is proportional to the pressure head loss of the fiber suspension in the conduit in flowing to the outlet, said pressure head loss providing a measure of the fiber concentration of the fiber suspension in the conduit, and means for feeding a signal proportional to the value as an input to a regulating system for the motor.

In apparatus in accordance with the invention, the actual value of the fiber concentration in the fiber suspension is obtained by dividing the power required for pumping the fiber suspension through a given section of said conduit by the flow rate through the same section, after possible correction for static head losses, and a measure of the pressure head loss is obtained. Thus, a regulation of the fiber concentration can be achieved with a short regulating time constant.

BRIEF DESCRIPTION OF DRAWING

The invention will now be described, by way of example, with reference to the accompanying drawing, in which.

DESCRIPTION OF PREFERRED EMBODIMENTS

Determination of the superficial weight of paper as it is being manufactured from fibre stock normally takes place immediately before the manufactured paper web is rolled up. The output from a superficial weight meter is supplied to a superior regulating equipment, normally a computerized equipment, which influences the volumetric flow of the fiber stock, for example by varying the speed of a pump supplying the fiber stock to the paper-making machine. This pump feeds into the system the amount of stock that is required to maintain the superficial weight constant. The stock is fed into an inlet box of the paper-making machine together with pulp water.

Figure 1:
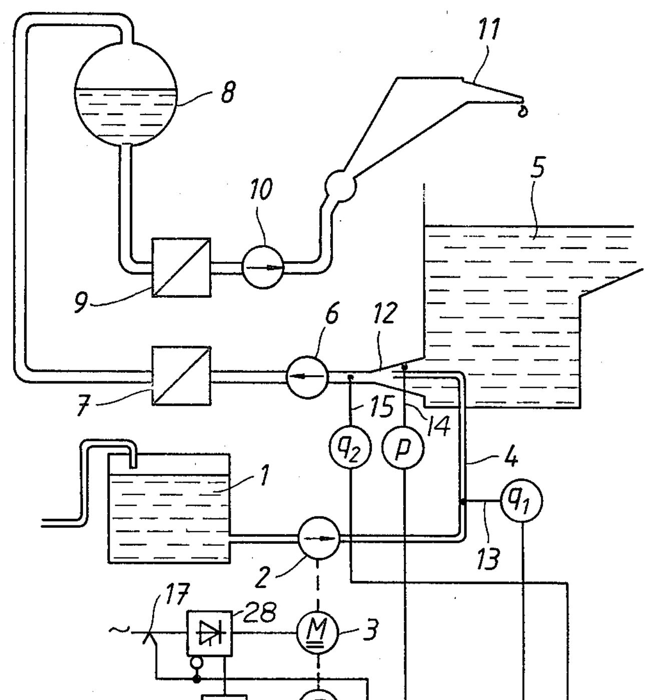
FIG. 1 is a schematic diagram of an apparatus in accordance with the invention for regulating the fiber concentration in fiber stock being supplied to a paper-making machine.
Figure 1:
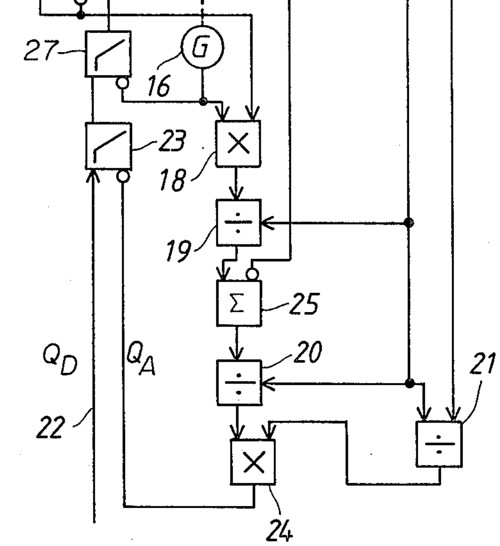

In the apparatus shown in FIG. 1, fiber stock is fed from a machine chest 1 into a conduit 4 by means of a machine chest pump 2, for example a centrifugal pump, driven by a variable-speed controlled d.c. motor 3. The conduit 4 supplies the fiber stock to the inlet 12 of a mixing pump 6 which also receives pulp water from the wire pit 5 of a paper-making machine. The mixing pump 6 feeds the mixture of fiber stock and water up to an aeration tank 8 via a vortex cleaner battery 7. From the aeration tank 8 the mixture of stock and water flows via a shive screen 9 to a pump 10 which forwards the mixture to the inlet box 11 of the papermaking machine.

In the conduit 4 between the pump 2 and the inlet 12 of the mixing pump 6, there is arranged, upstream of the inlet 12, a stock flow meter 13 which delivers an output signal $q_1$. A meter 14 is provided for measuring the static pressure p at the inlet 12 (which is the pressure at the outlet of the conduit 4) and a volumetric flow meter 15 at the inlet 12 delivers an output signal $q_2$. A tachometer generator 16 measures the speed n of the motor 3, and the current I supplied to the motor 3 is measured at 17.

Signals proportional to I and n are supplied to a multiplying device 18, the output signal of which is proportional to the power W fed to the pump 2. The output signal proportional to W is fed to a dividing device 19 together with a signal proportional to $q_1$, to produce a first input, which is proportional to $W/q_1$, to summation device 25. A signal proportional to the pressure p is also fed to the summation device via a polarity reversing input. The output signal from summation device 25, which is accordingly proportional to $W/q_1)-p$; or $\Delta W/q_1$, where $\Delta W$ is the power which the pump 2 has to deliver to overcome the dynamic resistance acting on the fiber suspension between the machine chest 1 and the inlet 12 to the mixing pump 6. This pump power $\Delta W$ is a measure of the fiber concentration of the fiber stock flowing through the conduit 4.

Figure 2:
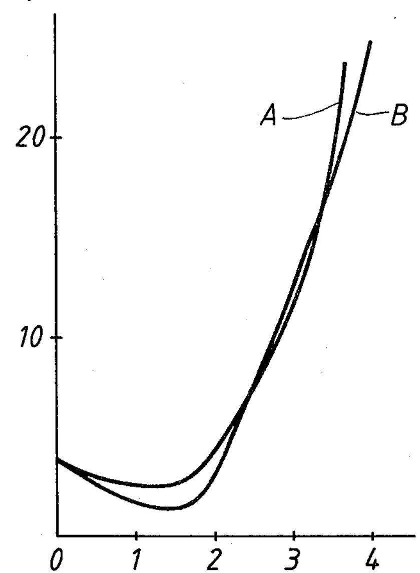
FIG. 2 is a graph showing the relationship between pressure head loss and fiber concentration in the conduit of the apparatus of FIG. 1.

FIG. 2 is a graph showing the relationship between the dynamic resistance to flow (mvp/100m) of the fiber stock in the conduit 4 and the fiber concentration (% by weight) in the fiber stock, the graph having been prepared with respect to a volumetric flow of the fiber stock of about 10,000 liters per minute. From this graph, in which the curve A relates to the sulphite content of the fibre stock and the curve B relates to the groundwood content of the the stock, it will be seen that, above a fiber concentration of about 2 percent, there is a substantially constant ratio between the dynamic resistance to flow and the fiber concentration.

In a dividing device 20 the output signal $\Delta W$ is divided by the signal $q_1$, and in a dividing device 21 the signal $q_1$ is divided by the signal $q_2$. The outputs of the two dividing devices 20 and 21 are fed to a multiplying device 24, the output $Q_A$ of which is a signal proportional to the actual fiber concentration in the fiber stock upstream (and also downstream) of the mixing pump 6.

The signal $Q_A$ is supplied to a process regulator 23, and to the same regulator, via a line 22, there is supplied a signal $Q_D$, derived from the aforementioned superior regulating system, which is proportional to the desired fiber concentration to achieve the required superficial weight of the paper being manufactured. The output signal from the process regulator 23, which represents the desired value of the speed of the motor 3, is fed to a motor control unit 2791, to which a signal proportional to the actual speed of the motor 3, derived from the tachometer generator 16, is also fed. The output of the control unit 27 is fed to a device 28 for varying the speed of the motor 3.

The above-described apparatus makes possible a rapid regulation of the fiber concentration in the fiber stock, which is less dependent on the rate of stock flow than is the case with previously employed apparatus used to regulate fiber concentration.

The flow meter 13 may be of a kind which is available on the market. It may, for example, be of the magnetic type, a so-called average speed transducer, provided with a polymer lining. In this meter the conductivity of the flowing medium is utilized to measure the flow rate. A particularly suitable flow meter is made by Fisher & Porter and is described in Pamphlet No. YL 271-352 published by ASEA Aktiebolag of Västerås, Sweden.

Since, under certain circumstances, the flow rate $q_1$ is approximately equal to the motor speed n, the torque of the motor 3 is also an approximate measure of the fiber concentration of the fiber stock flowing in the conduit 4. A signal proportional to the torque of the motor 3 may therefore be employed as a measure of the fiber concentration in a simplified form of the apparatus of FIG. 1.

What is claimed is:

1. Apparatus for regulating the fiber concentration of a fiber suspension, when above about 2 per cent by weight fibers, during transport of said fiber suspension through a conduit to an outlet thereof, the fiber suspension being mixed with a liquid diluent, said apparatus comprising
   - a variable speed-controlled electric motor,
   - a regulating system for controlling the operation of said electric motor,
   - a first pump driven by said electric motor for impelling said fiber suspension through the conduit toward said outlet,
   - means for generating a signal representative of the power W supplied to said first pump by said electric motor,
   - a second pump for mixing the fiber suspension issuing from said outlet with the liquid diluent,
   - a flow meter providing an output signal $q_1$ proportional to the flow of said fiber suspension in said conduit,
   - means for providing an output signal $q_2$ proportional to the flow of said fiber suspension and liquid diluent through said second pump,
   - a first dividing means to which said signal representative of the power W and said output signal $q_1$ are fed, said first dividing means generating a first output signal which represents a measure of the fiber concentration Q,
   - a summation means to which said first output signal is fed, said summation and dividing means adjusting the first signal based on the static pressure head loss which occurs in said conduit, thereby providing a second output signal which is proportional to the power consumed by said first pump in overcoming the dynamic resistance to flow of said fiber suspension in said conduit,
   - a dividing means for obtaining a signal proportional to $(q_1/q_2)$, and
   - a dividing and multiplying means to which said second output signal is fed, to which said output signal $q_1$ is fed and to which said signal proportional to $(q_1/q_2)$ is fed, said dividing and multiplying means generating a signal $Q_A$ which is proportional to the actual fiber concentration in the fiber stock upstream and downstream of said second pump and which is fed to said regulating system.

2. Apparatus according to claim 5, wherein said means for generating a signal representative of the power W supplied to said first pump comprises
   - a first measuring device sensing the current supplied to said electric motor,
   - a second measuring device sensing the speed of said electric motor,
   - a second multiplying device, and
   - means for supplying the outputs of said first and second measuring devices to said second multiplying device.

* * * * *